J. C. BLOOMFIELD.
COMBINED DRAG AND HARROW.
APPLICATION FILED APR. 14, 1917.

1,254,568.

Patented Jan. 22, 1918.
2 SHEETS—SHEET 1.

WITNESSES
J H Crawford
Edward Yeager

INVENTOR
J. C. Bloomfield,
BY Victor J. Evans
ATTORNEY

J. C. BLOOMFIELD.
COMBINED DRAG AND HARROW.
APPLICATION FILED APR. 14, 1917.
1,254,568.
Patented Jan. 22, 1918.
2 SHEETS—SHEET 2.
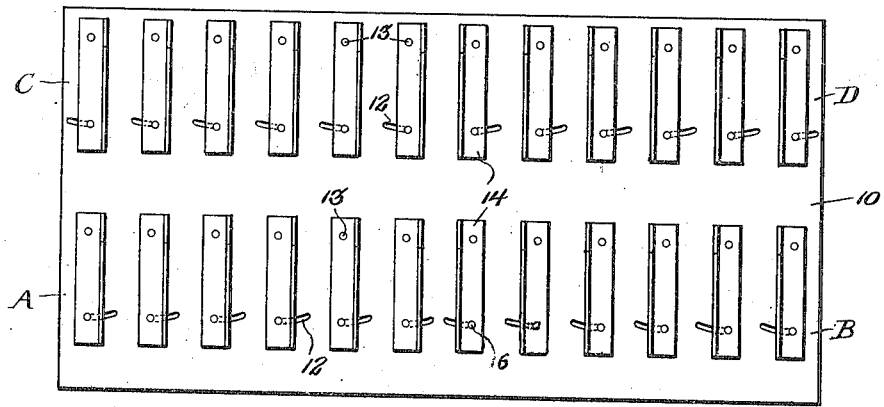
Fig. 2.
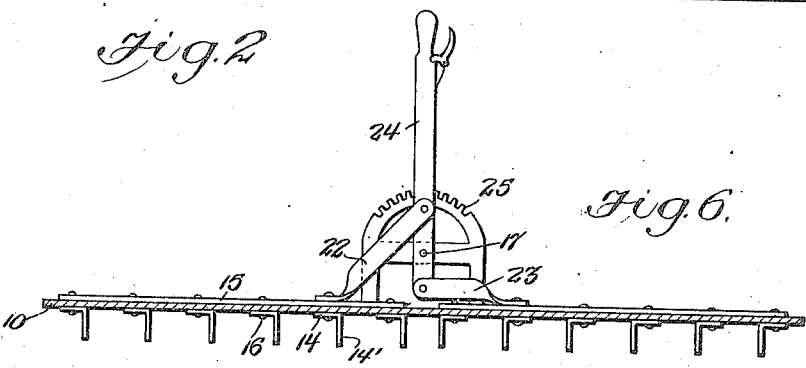
Fig. 6.
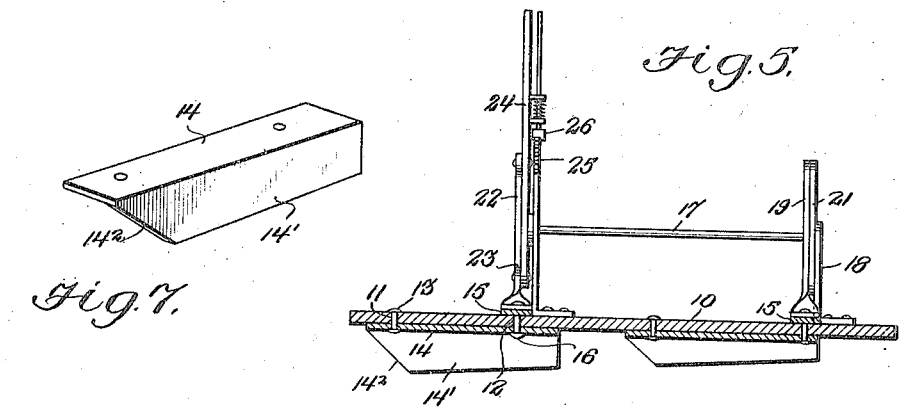
Fig. 7.
Fig. 5.
WITNESSES
J. H. Crawford
Edward Yeogh
INVENTOR
J. C. Bloomfield,
BY Victor J. Evans
ATTORNEY

UNITED STATES PATENT OFFICE.

JOHN C. BLOOMFIELD, OF EAST COLUMBUS, OHIO.

COMBINED DRAG AND HARROW.

1,254,568. Specification of Letters Patent. Patented Jan. 22, 1918.

Application filed April 14, 1917. Serial No. 162,075.

*To all whom it may concern:*

Be it known that I, JOHN C. BLOOMFIELD, a citizen of the United States, residing at East Columbus, in the county of Franklin and State of Ohio, have invented new and useful Improvements in Combined Drags and Harrows, of which the following is a specification.

The present invention comprehends the provision of a combined harrow, drag and pulverizer, and is characterized by the provision of a construction by means of which the soil can be prepared for seeding, and more particularly hurriedly leveled so as to retain the moisture, which is so essential for growth.

To this end the invention embodies among other features a platform upon which are pivotally mounted parallel rows of blades arranged in series, the blades being capable of assuming positions relatively to work the soil covered by the entire area of the platform, and to further provide spaces between the blades so that the platform will contact with the surface to assist in hurriedly leveling the same with one application of the device.

The nature and advantages of the invention will be better understood when the following detail description is read in connection with the accompanying drawings, the invention residing in the construction, combination and arrangement of parts as claimed.

In the drawings forming part of this specification like numerals of reference indicate similar parts in the several views, and wherein:—

Fig. 2 is a bottom plan view.

Fig. 5 is a transverse sectional view taken on line 5—5 of Fig. 1.

Fig. 6 is a longitudinal sectional view on line 6—6 of Fig. 1.

Fig. 7 is a detail view of one of the blades.

Figure 1:
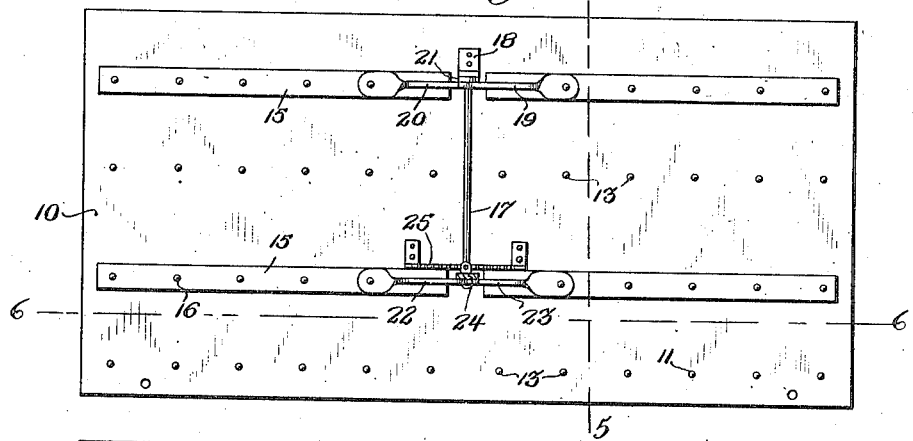
Figure 1 is a top plan view.

Referring more particularly to the drawings in detail, the invention essentially consists of a platform 10 which may be constructed from any suitable material and design, but which is preferably of rectangular formation as shown. At opposite sides of the longitudinal center of the platform, the latter is provided with spaced parallel rows of openings and arcuate-shaped slots 11 and 12 respectively, while these openings and slots are arranged in series at opposite sides of the transverse center of the platform, so that the platform is provided with four series one at each corner and each series is indicated at A, B, C, and D, as clearly illustrated in Fig. 3. The distinguishing features between the respective series reside in the arrangement of the slots 12, it being noted that the innermost end of the slots 12 of the series A faces the corresponding extremities of the slots 12 of the series B, while the corresponding outermost extremities of the slots 12 of the series C and D are most remote. The purpose of this specific arrangement will be hereinafter more fully described. For each opening and slot of the respective series thereof, is a blade of the design illustrated in Fig. 7, wherein it will be noted that the blades are substantially L-shaped in cross section. Each blade is mounted for swinging movement upon a pivot 13, which pivots are arranged in the openings 11. As shown the pivot is passed through the horizontally disposed branch 14 of the blade, adjacent one extremity, while the blade is of sufficient length to overlie the alined slot 12. Extending longitudinally from the platform, on the upper side of the latter, is a plurality of reciprocating elements 15, there being four of these elements, one for the slots 12 of each series, and across which slots the elements reciprocate. The extremities of the blades overlying the said slots are connected with their respective element 15 in any suitable manner, preferably by means of the pins or studs 16, and consequently when said elements are reciprocated, the angular relationship between said blades of the different series is varied. The studs 16 obviously operate in the slots 12, and coming in engagement with the opposite ends of said slots limit the adjustment of the blades.

Any suitable means may be employed for reciprocating the elements 15, and these elements may if desired be manipulated independently of each other. However I prefer to reciprocate said elements simultaneously, whereby the blades of the respective series will change their angular relation in unison. To this end I preferably employ a rock shaft 17 which is disposed transversely of the platform, and journaled in suitable brackets 18. Relatively long and short arms 19 and 20 respectively are connected to the adjacent extremities of two of the alined elements 15, with the opposite corresponding extremities of said arms normally disposed above and below the shaft 17, and pivotally connected with a link 21 carried by the shaft and fixed thereto in any suitable manner for partial rotation therewith. The adjacent extremities of the remaining two elements 15 have connected thereto relatively long and short arms 22 and 23 respectively, but in this instance the opposite corresponding extremities of said arms which are normally disposed above and below the shaft 17 are pivotally associated with an operating lever 24, the latter being fixed upon the shaft 17 as shown. Manifestly by swinging the lever in one or the other direction movement is imparted to the arms 22 and 23 respectively, which in turn reciprocate the elements 15 to which they are connected. During this movement of the lever the shaft 17 is partially rotated together with the link 21, and movement is imparted to the arms 19 and 20 so that the remaining two elements 15 are reciprocated, with a result that the blades of the respective series have their angular relation changed. One of the brackets 18 is preferably provided with a rack surface 25 which is engaged by a pawl 26 carried by the lever, so that the blades may be fixed relatively in their adjusted positions. It will be noted that the vertical branches 14' of the blades constituting the series A and B are slightly tapered toward their rear edge, while the corresponding branches of the blades constituting the series C and D are similarly tapered, but are of less height than the height of the blades at the forward edge of the platform, so that a continued taper is provided by the two parallel rows of blades. The blades are also cut obliquely at their forward corners as at 14².

Figure 3:
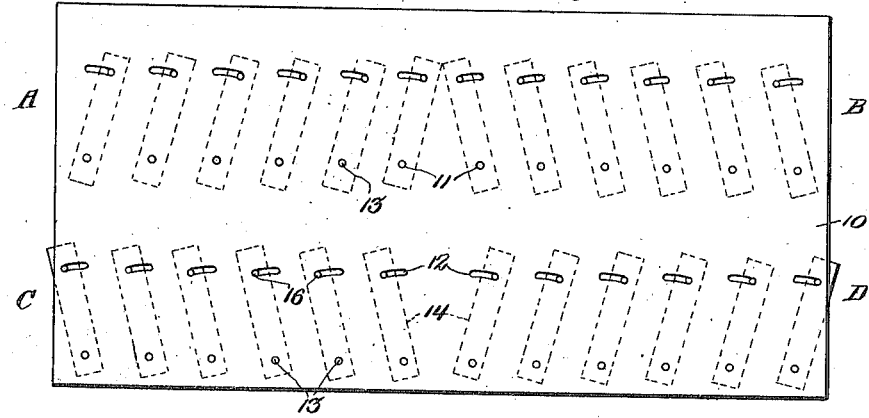
Fig. 3 is a diagrammatic view showing by dotted lines the relative adjusted positions of the blades at opposite sides of the transverse center of the platform.
Figure 4:
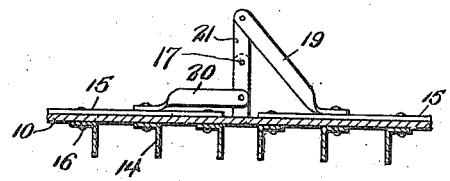
Fig. 4 is a partial sectional view.

It will now be observed that the blades constituting the series A and B are pivoted adjacent the forward edge of the platform, and when the studs 16 of these blades engage the innermost ends of the slots 12 the blades are in straight away position, but by reason of the specific disposition of the slots 12 of the series A and B, the blades of the respective series are capable of swinging movement inwardly to assume a position indicated by dotted lines in Fig. 3. However the blades constituting the series C and D are pivoted at a point adjacent the longitudinal center of the platform, with the slots 12 for these series so disposed, that when the studs 16 of said blades are arranged at the outermost ends of the slots, the blades will also occupy a straight away position. The blades in this instance however swing in a reverse direction with regard to the blades of the series A and B, and are capable of assuming a position with respect to the blades of the series A and B as that indicated by dotted lines in Fig. 3. The purpose for this arrangement resides in the fact that as the device is dragged over the soil, that area of soil covered by the platform is completely worked, with a view of breaking up the clogs of dirt and preparing the soil for seeding. The construction and arrangement of blades also provide spaces between the blades, whereby the platform can come in direct contact with the soil, with a view of hurriedly leveling the same, to retain the moisture which is so essential to growth. The device in its entirety, in addition to being extremely simple in its construction, is very efficient for the purpose intended, and can be very easily pulled or dragged over the surface.

It is believed that from the foregoing description the nature and advantages of the invention will be readily apparent, and while I have shown and described what I now consider the preferred embodiment of the invention, I desire to have it understood that what is herein shown and described is not considered restrictive, and that such changes may be resorted to when desired as fall within the scope of what is claimed.

What is claimed is:—

1. A device of the character described embodying a platform, spaced parallel rows of blades swingingly mounted upon the platform, each row being subdivided into separate series, the respective series of each row being capable of movement toward and away from each other for changing the angular relationship of the respective series, and means for simultaneously adjusting said series.

2. A device of the class described embodying a platform, spaced parallel rows of blades swingingly mounted upon said platform, and means for simultaneously adjusting said blades for changing the angular relationship of the respective rows for the purpose specified.

3. A device of the character described embodying a platform, spaced parallel rows of blades mounted thereon for swinging movement, means simultaneously adjusting said blades for changing the angular relationship of the respective rows, and means for holding said blades fixed relative to the platform in any of their adjusted positions.

4. A device of the class described embodying a platform, spaced rows of spaced parallel blades mounted upon the platform, and capable of swinging movement, and means for simultaneously adjusting the blades of one row in a reverse direction to the adjustment of the blades of the adjacent row, and means for holding said blades fixed in their adjusted position.

5. A device of the class described embodying a platform, spaced parallel rows of blades mounted for swinging movement upon the platform, each row being subdivided into separate series, and means for simultaneously adjusting the blades in series for changing the angular relationship between the respective rows for the purpose specified.

6. A device of the class described embodying a platform, spaced parallel rows of blades mounted thereon and capable of swinging movement, each row being subdivided into separate series of blades, the respective series of each row being capable of swinging movement in a reverse direction, and means for simultaneously adjusting the blades of said series to change the angular relationship of the blades of the respective rows.

7. A device of the class described embodying a platform, spaced parallel rows of blades mounted thereon and capable of swinging movement, the blades of one row being capable of an adjustment in a reverse direction to the blades of the adjacent row, each row being subdivided into a separate series of blades, the series of each row being capable of adjustment in a reverse direction, and means for simultaneously adjusting the blades in series of each row for the purpose described.

In testimony whereof I affix my signature.

JOHN C. BLOOMFIELD.

Copies of this patent may be obtained for five cents each, by addressing the "Commissioner of Patents, Washington, D. C."